United States Patent
Zhang

(10) Patent No.: US 9,746,716 B2
(45) Date of Patent: Aug. 29, 2017

(54) LIQUID CRYSTAL DISPLAY PANEL AND DISPLAY DEVICE WITH ELASTIC MATERIAL FILLED IN FILLING REGION BETWEEN FIRST AND SECOND SUBSTRATE

(71) Applicants: BOE TECHNOLOGY GROUP CO., LTD., Beijing (CN); BEIJING BOE DISPLAY TECHNOLOGY CO., LTD., Beijing (CN)

(72) Inventor: Hongshu Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 170 days.

(21) Appl. No.: 14/546,135

(22) Filed: Nov. 18, 2014

(65) Prior Publication Data

US 2016/0026018 A1    Jan. 28, 2016

(30) Foreign Application Priority Data

Jul. 24, 2014 (CN) .......................... 2014 1 0355440

(51) Int. Cl.
    *G02F 1/1339* (2006.01)
(52) U.S. Cl.
    CPC ........ *G02F 1/1339* (2013.01); *G02F 1/13394* (2013.01)
(58) Field of Classification Search
    CPC .. G02F 1/1339; G02F 1/13394; G02F 1/1341; G02F 1/133345; G02F 1/1303; G02F 2001/133519
    See application file for complete search history.

(56) References Cited

U.S. PATENT DOCUMENTS

| 6,734,944 B1 | 5/2004 | Koseki et al. |
| 2010/0302496 A1 | 12/2010 | Zhao |
| 2014/0049157 A1 | 2/2014 | Kim et al. |

FOREIGN PATENT DOCUMENTS

| CN | 101880439 A | 11/2010 |
| CN | 101900911 A | 12/2010 |

(Continued)

OTHER PUBLICATIONS

Yuhua Chinese Patent Application Publication 101017288, Aug. 2007, machine translation.*

(Continued)

*Primary Examiner* — Tracie Y Green
(74) *Attorney, Agent, or Firm* — Ladas & Parry LLP

(57) ABSTRACT

Embodiments of the invention disclose a liquid crystal display panel and a display device. The liquid crystal display panel comprises a first substrate and a second substrate disposed to be opposed to each other, the first substrate and the second substrate being bonded by sealant located in peripheral regions of the first substrate and the second substrate to form a box-shaped space, with liquid crystal and a spacer for supporting the box-shaped space filled in the box-shaped space. The spacer is disposed at a position close to the sealant; as viewed in a direction perpendicular to the first substrate or the second substrate, a filling regions is enclosed by the sealant and the spacer, and an elastic material is filled in the filling regions between the first substrate and the second substrate.

20 Claims, 2 Drawing Sheets

(56) References Cited

FOREIGN PATENT DOCUMENTS

CN         102636914 A     8/2012
JP         2000-321580 A     11/2000

OTHER PUBLICATIONS

Liu et al. (Chinese Patent Application Publication 101320174, Oct. 2008, machine translation.*
First Chinese Office Action dated Jul. 19, 2016; Appln. No. 201410355440.9.
Second Chinese Office Action dated Mar. 2, 2017; Appln. No. 201410355440.9.

* cited by examiner

LIQUID CRYSTAL DISPLAY PANEL AND DISPLAY DEVICE WITH ELASTIC MATERIAL FILLED IN FILLING REGION BETWEEN FIRST AND SECOND SUBSTRATE

TECHNICAL FIELD

Embodiments of the invention relate to a liquid crystal display panel and a display device

BACKGROUND

A Thin Film Transistor-Liquid Crystal Display (TFT-LCD) includes a color filter substrate, an array substrate, and a liquid crystal layer filled in between the color filter substrate and the array substrate. Due to contraction or expansion of volume of liquid crystal molecules with changes of temperature, and a vacuum sealed structure of a liquid crystal panel, vacuum bubbles in a low temperature state or gravity defect in a high temperature state may occur to the liquid crystal panel. Accordingly, it is stipulated in the fabrication process of the liquid crystal display that a liquid crystal filling range allowed in which no vacuum bubble at a low temperature or gravity defect at a high temperature occurs is referred to as a liquid crystal amount range.

In order to control uniformity of thickness of the liquid crystal layer, that is, to ensure a liquid crystal layer margin to be uniformly distributed in the liquid crystal panel, a layer of elastic Post Spacer (PS) is disposed between the color filter substrate and the array substrate in the prior art, for supporting the color filter substrate and the array substrate and for maintaining spacing between the two, to avoid mutual dislocation of the color filter substrate and the array substrate or defects such as light leakage, uneven image quality caused by failure of timely restoration of the spacing of the liquid crystal panel, when the panel with a closed structure is subject to an action of external force.

In the prior art, there are at least problems as described below: when the liquid crystal is affected by temperature to contract too much, rendering the liquid crystal layer margin exceeding a lower limit, and when a deformation amount of the PS reaches a certain extent that cannot satisfy a contraction amount of the liquid crystal due to a limited elasticity of the PS, the further contracted liquid crystal will form vacuum bubbles between the color filter substrate and the array substrate, and as a result, the display cannot display normally; when the liquid crystal is affected by temperature to expand too much, rendering the liquid crystal layer margin exceeding an upper limit, due to expansion force of the liquid crystal, the spacing between the color filter substrate and the array substrate is increased and a volume of the PS shrinks, that is, spacing occurs between the PS and the array substrate in their original contact position, so that space where the liquid crystal is located becomes large; as a result, the liquid crystal slides down under an action of gravity, and gravity defect occurs. To avoid the above-described problems, it is necessary to strictly control the amount of liquid crystal instilled into the liquid crystal panel to be within the liquid crystal amount range; however, since the liquid crystal amount range is relatively small, it is difficult to control during a fabrication process.

SUMMARY OF THE INVENTION

Some embodiments of the invention provides a liquid crystal display panel, comprising: a first substrate and a second substrate disposed to be opposed to each other, the first substrate and the second substrate being bonded by sealant located in peripheral regions of the first substrate and the second substrate to form a box-shaped space, with liquid crystal and a spacer for supporting the box-shaped space filled in the box-shaped space, wherein, the spacer is disposed at a position close to the sealant, as viewed in a direction perpendicular to the first substrate or the second substrate, a filling region is enclosed by the sealant and the spacer, an elastic material is filled in the filling region between the first substrate and the second substrate.

In one example, as viewed in the direction perpendicular to the first substrate or the second substrate, the filling region has a width of 1 mm~10 mm along a direction perpendicular to an extending direction of the sealant.

In one example, the elastic material is formed by mixing 6101 epoxy resin, propylene carbonate and diethylene triamine at a predetermined ratio.

In one example, the predetermined ratio is a mass ratio of 5:4:1.

In one example, one end of the spacer is in contact with the first substrate, and the other end of the spacer is spaced from the second substrate by a predetermined distance, a distance between the elastic material and the second substrate being equal to the predetermined distance.

In one example, the predetermined distance is 0.01 μm~0.1 μm.

In one example, as viewed in a direction perpendicular to the first substrate or the second substrate, the spacer is a continuous pattern or comprises a plurality of segments separated from each other.

In one example, the spacer forms the continuous pattern at an inner side of the sealant, the spacer being spaced from the sealant by a distance equal to the filling width of the filling region.

In one example, the filling region is a continuous region enclosed by the spacer and the sealant.

In one example, the spacer comprises the plurality of segments, each segment defines one sub-region together with the sealant, and the filling region comprises a plurality of sub-regions.

According to another embodiment of the invention, there is provided a display device, comprising the liquid crystal display panel according to any one of the above.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
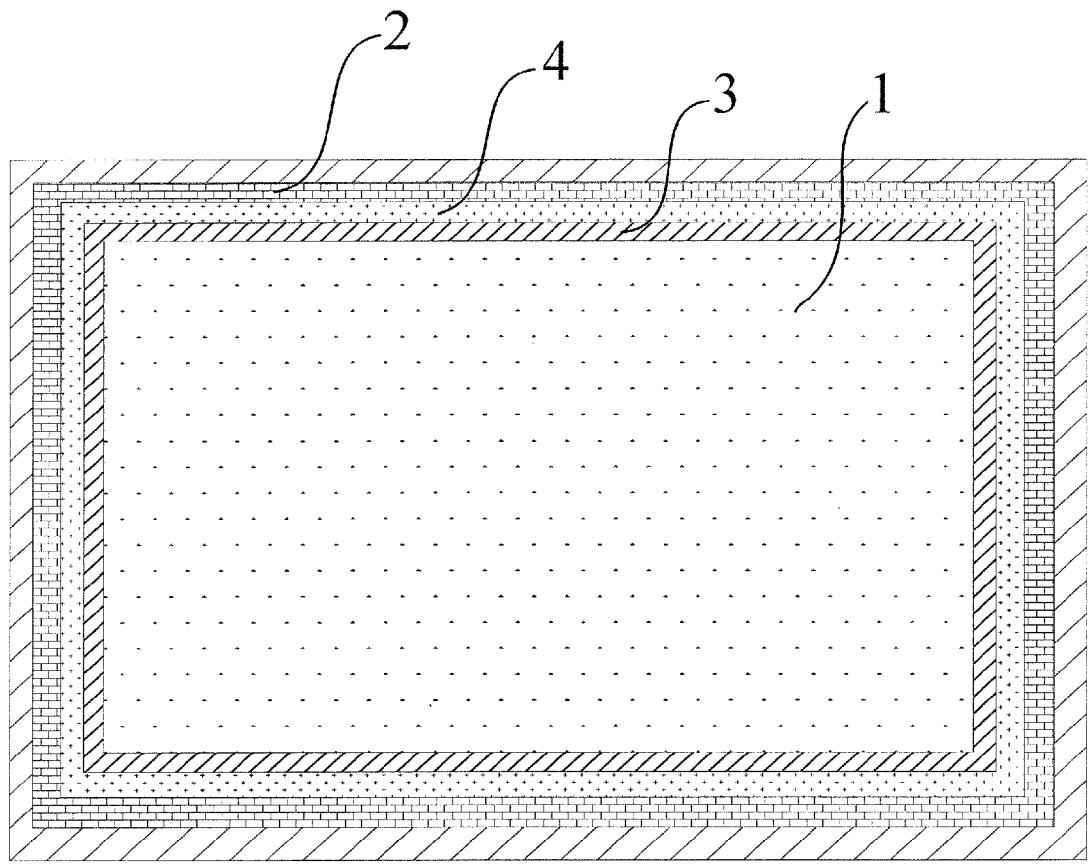
FIG. 1 is a structural schematic diagram of a liquid crystal panel provided by an embodiment of the invention.
Figure 2:
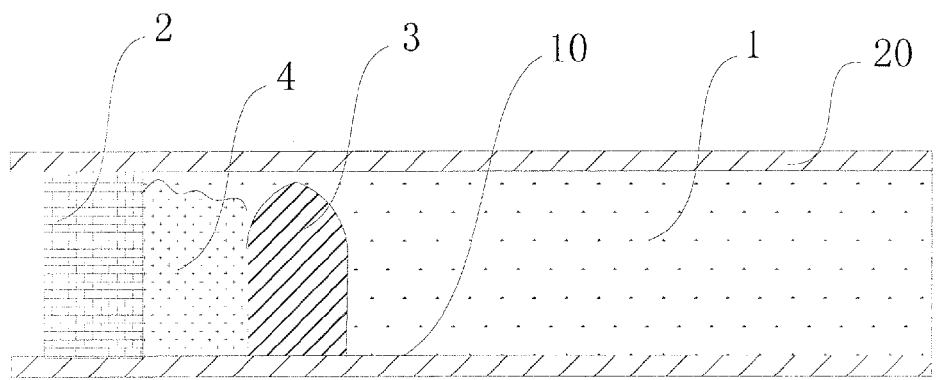
FIG. 2 is a state diagram of the liquid crystal panel provided by the embodiment of the invention at a room temperature.

With reference to FIGS. 1 and 2, the liquid crystal display panel provided by an embodiment of the invention comprises a first substrate and a second substrate disposed to be opposed to each other, the first substrate 10 and the second substrate 20 being bonded by sealant 2 located in peripheral regions of the first substrate 10 and the second substrate 20 to form a box-shaped space, with liquid crystal 1 and a spacer 3 for supporting the box-shaped space filled in the box-shaped space, the spacer 3 being disposed at a position close to the sealant 2. For example, as viewed in a direction perpendicular to the first substrate 10 and the second substrate 20, the sealant 2 forms a closed pattern, e.g., a rectangular shape. The box-shaped space is formed between the first substrate 10 and the second substrate 20, and is located at an inner side of the sealant 2. A semi-closed space is formed between the spacer 3, the sealant 2, the first substrate 10 and the second substrate 20, and an elastic material 4 is filled in the semi-closed space. Here the semi-closed space formed refers to that a top of the spacer is spaced from the second substrate 20 by a predetermined distance, so that the space is not completely closed.

In a low temperature state, when the amount of liquid crystal filled in the panel is close to a lower limit or at the lower limit, the liquid crystal 1 contracts to form a vacuum space in the panel, and the elastic material 4 expands in the vacuum space to fill up such part of space; as compared with an arrangement of the PS used in the prior art, due to a strong elasticity and a large range of deformation amount of the elastic material 4, a corresponding fillable vacuum space range is also relatively large, and the lower limit for the liquid crystal amount range instilled may be further lowered, i.e., when less amount of liquid crystal is instilled, the elastic material 4 still has enough deformation amount to fill the vacuum space formed thereby, thus preventing formation of vacuum bubbles; in a high temperature state, when the amount of liquid crystal filled in the panel is close to an upper limit or at the upper limit, the liquid crystal 1 expands to squeeze the elastic material 4 to make it contract and shrink in volume, the expanding liquid crystal 1 fills in the space where the elastic material 4 contracts, attenuating squeeze thereof to the first substrate and the second substrate; as compared with the arrangement of the PS used in the prior art, due to a strong elasticity and a large range of deformation amount of the elastic material 4, a corresponding contractible space range is also relatively large, and the upper limit for the liquid crystal amount range instilled may be further raised, i.e., when more amount of liquid crystal is instilled, the elastic material 4 still has enough deformation amount to contract under the squeeze of the liquid crystal 1, to form a space to accommodate the expanding liquid crystal 1. As described above, as compared with the arrangement of the PS used in the liquid crystal panel in the prior art, the elastic material 4 lowers the lower limit and raises the upper limit thereof on the basis of the original liquid crystal amount range, enlarges the instillable range of the liquid crystal 1, so that liquid crystal instillation is easier to operate during a fabrication process of the liquid crystal panel.

For example, a filling width of the elastic material 4 is 1 mm~10 mm, and the filling width is a distance that the spacer 3 is spaced from the sealant 2, that is, the spacing distance between the spacer 3 and the sealant 2 is controlled indirectly by controlling the filling width of the elastic material 4. Conversely, a fillable volume of the elastic material 4 is controlled by controlling a size of the spacing distance between the spacer 3 and the sealant 2, so that the elastic material 4 is bonded to sidewalls of the spacer 3 and the sealant 2, to prevent the spacer 3 from affecting a normal display region of the liquid crystal panel. Typically, a distance from a boundary of the normal display region of the liquid crystal panel to the sealant is set as 1 mm~10 mm; with ensuring normal display of the liquid crystal panel as a standard, the elastic material 4 is coated with a thickness as required.

For example, in order that the volume of the elastic material 4 changes with pressure so as to be applicable to the liquid crystal display panel, it is set that the elastic material is formed by mixing 6101 epoxy resin, propylene carbonate and diethylene triamine at a predetermined ratio. For example, the predetermined ratio is a mass ratio of 5:4:1. When used, they are mixed and stirred uniformly, placed at a room temperature for 8-16 hours, and coated on an outer edge of the spacer 3. The 6101 epoxy resin refers to E44 bisphenol A type liquid epoxy resin, where E represents bisphenol A type epoxy resin, 44 represents an epoxy value of 0.44, the epoxy value denoting an amount of a substance of epoxy group contained in every 100 g of resin; the 6101 epoxy resin has a relatively low viscosity and a strong adhesion, and after solidification, it has a large cross-linking degree, a very strong cohesion, and a fine molecular structure, so its mechanical function is higher than that of general types of thermosetting resin such as phenolic resin and unsaturated polyester, and it is applicable to a relatively wide range of temperature. As a material for preparing the elastic material 4 in the liquid crystal panel, it has a good elasticity and a good temperature adaptability, which can ensure normal display of the liquid crystal panel at a high liquid crystal amount and a low liquid crystal amount.

Figure 3:
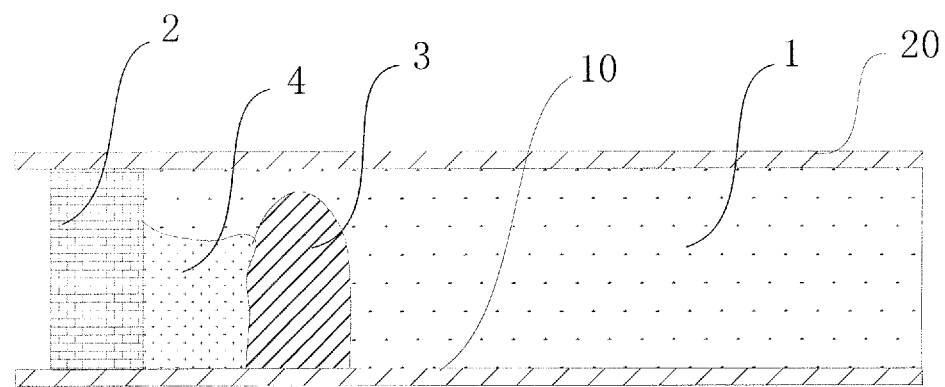
FIG. 3 is a state diagram of the liquid crystal panel provided by the embodiment of the invention at a high temperature.
Figure 4:
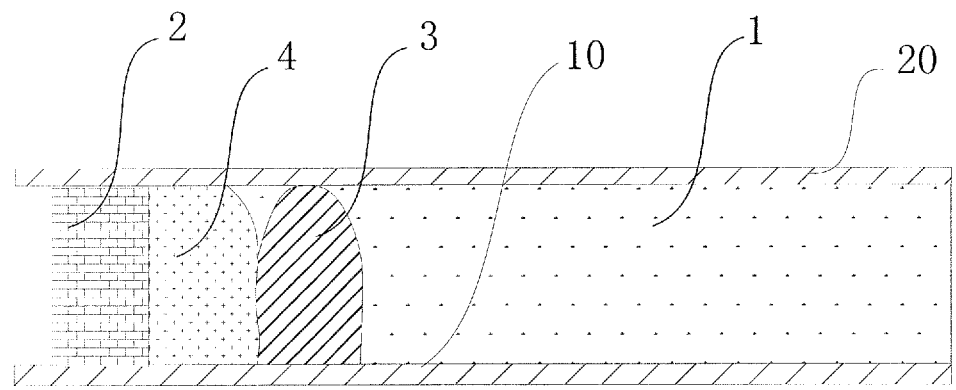
FIG. 4 is a state diagram of the liquid crystal panel provided by the embodiment of the invention at a low temperature.

It should be noted that, the first substrate 10 in the embodiment of the invention may be a color filter substrate, and the corresponding second substrate 20 is an array substrate; or the first substrate 10 may be an array substrate, then the corresponding second substrate 20 is a color filter substrate; and types of the first substrate 10 and the second substrate 20 are not limited here. For example, in the embodiment of the liquid crystal display panel, the color filter substrate is selected as the first substrate 10, and the array substrate as the second substrate 20. With reference to FIG. 2 to FIG. 4, a lower end of the spacer 3 is in contact with the color filter substrate, a distance between the spacer 3 and the array substrate is determined according to an actual instillation amount of the liquid crystal 1, so that a height of the spacer 3 coordinates with the instillation amount of the liquid crystal 1, to ensure normal display of the liquid crystal display panel under both a low temperature condition and a high temperature condition. For example, with reference to FIG. 4, in a low temperature state, the liquid crystal 1 contracts, and the elastic material 4 expands, deforms and increases in volume under a vacuum condition; in order to prevent the elastic material 4 from excessively expanding and overflowing out of the space formed by the spacer 3 and the sealant 2, the height of the spacer 3 should allow contact with the array substrate after contraction, limit excessive expansion of the elastic material 4 to mix with the liquid crystal to cause poor display on the edges of the normal display region, and maintain normal display of the liquid crystal display in a low temperature state; with reference to FIG. 3, in a high temperature state, the liquid crystal 1 expands, and the elastic material 4 contracts, deforms and reduces in volume under squeeze of the liquid crystal 1; in order that the liquid crystal 1 can enter the space formed by the spacer 3 and the sealant 2 when expanding, a height of the spacer 3 should allow separation from the array substrate and a distance between the two being greater than a predetermined distance, so that the liquid crystal 1 expanding at a high temperature is rapidly in contact with the elastic material 4 and squeezes the latter, to prevent occurrence of gravity defect; with reference to FIG. 2, when the amount of liquid crystal is a central value at a room temperature, an upper end of the spacer 3 is spaced from the array substrate by a predetermined width; on the one hand, a condition to be satisfied is that: in a low temperature state, the liquid crystal 1 contracts, and the elastic material 4 expands under a vacuum condition, deforms and increases in volume, then the elastic material 4 does not overflow out of the space formed by the spacer 3 and the sealant 2; on the other hand, a condition to be satisfied is that: in a high temperature state, the liquid crystal 1 expands, and the liquid crystal 1 can be in contact with the elastic material 4 via the spacing between the spacer 3 and the array substrate, and squeeze the elastic material 4 to make it contract, deform and reduce in volume; in order to satisfy the above-described two conditions, it is necessary that a predetermined distance is set between the spacer 3 and the array substrate, for example, the predetermined distance is 0.01 μm~0.1 μm. A width of the spacer 3 itself is (e.g., FIG. 2 is a partial cross-sectional diagram intercepted in a direction perpendicular to an expansion direction of the spacer 3 in FIG 1, and the width refers to a size in a direction along a surface of the substrate in the cross section), for example, 20 μm~200 μm, at which time the spacer 3 and the elastic material 4 coordinate with each other, which has the best effect on contraction and expansion of the liquid crystal 1.

With reference to FIG. 2, the upper end of the spacer 3 is spaced from the second substrate 20 by a predetermined distance, a distance between the elastic material 4 and the array substrate is equal to the predetermined distance, which, on the premise that the amount of liquid crystal instilled is certain, ensures that the elastic material 4 can achieve the best effect in both the low temperature state and the high temperature state. For example, on the one hand, when the amount of liquid crystal is low, the elastic material 4 in the low temperature state is avoided being too close to the array substrate, a space available for the elastic material 4 to expand between the spacer 3 and the sealant 2 being relatively small, so that the elastic material 4 overflows out of the space; or the elastic material 4 in the low temperature state being too far away from the array substrate, a space available for the elastic material 4 to expand between the spacer 3 and the sealant 2 being relatively large, so that the deformation amount of the elastic material 4 does not meet the contraction amount of the liquid crystal 1, which renders vacuum bubbles. On the other hand, when the amount of liquid crystal is high, the elastic material 4 in the high temperature state is avoided being too close to the array substrate, a space between the spacer 3, the sealant 2 and the elastic material 4 being relatively small, so that the elastic material 4 after deformation under squeeze of the expanding liquid crystal 1 is still not enough to absorb the expansion amount of the liquid crystal 1, or the elastic material 4 in the high temperature state being too far away from the array substrate, a space between the spacer 3, the sealant 2 and the elastic material 4 being relatively large, so that the expansion amount of the liquid crystal 1 at the high temperature can be absorbed by the space, and the elastic material 4 itself is not subject to an expanding force of the liquid crystal 1, then no deformation or contraction occurs, at which time such setting of the elastic material 4 is of no significance.

Figure 5:
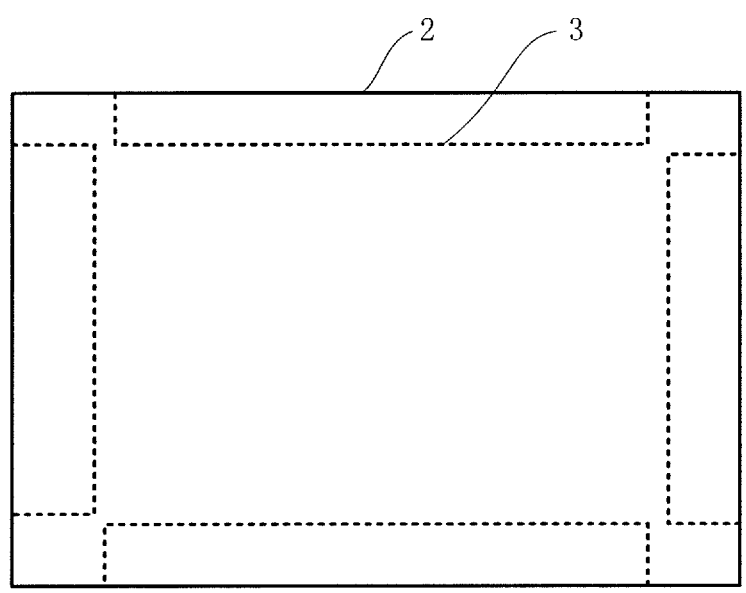
FIG. 5 is a schematic diagram showing a spacer comprising a plurality of segments.

With reference to FIG. 1, in a viewing angle perpendicular to the array substrate or the color filter substrate, a shape constituted by the spacer 3 is a continuous pattern or comprises a plurality of segments; when the spacer 3 is the continuous closed pattern, four edges thereof are parallel to four edges of the sealant 2, and the spacer 3 and the sealant 2 form a space with a closed cross section for placing the elastic material 4, as shown in FIG. 1. When the spacer 3 comprises a plurality of segments, the spacer 3 and the sealant 2 also form discontinuous spaces with a closed cross section for placing the elastic material 4, as shown in FIG. 5. In FIG. 5, only the sealant 2 and the spacer 3 are schematically shown with different lines. There are four spacer segments, which forms four discontinuous spacers with the sealant 2. It should be noted, the number and the specific shape of the spacer segments are not limited to those shown in FIG. 5. Alternatively, a pattern of the spacer 3 is a closed pattern in a shape such as a straight line, a wavy line, or brackets, to ensure no poor edge of the normal display region. That is to say, as viewed in the direction perpendicular to the first substrate or the second substrate, a filing region is enclosed by the sealant and the spacer. In the case shown in FIG. 1, a continuous filling region is enclosed by the sealant and the spacer. In the case shown in FIG. 5, a plurality of sub-regions are enclosed by the segments of the spacer and the sealant, respectively, and the tilling regions comprises a plurality of such sub-regions.

With reference to FIG. 1, the spacer 3 forms a second closed pattern at the inner side of the first closed pattern formed by the sealant 2, the second closed pattern and the first closed pattern are the same or different, that is, the line shapes of the first closed pattern and the second closed pattern may be the same or different; however, whether the line shape of the first closed pattern and the second closed pattern is a straight line or a wavy line, the second closed pattern is spaced from the first closed pattern by a predetermined distance; in the predetermined distance of the spacing, a continuous closed pattern for placing the elastic material 4 is formed between the first closed pattern and the second closed pattern, the inner side being a side close to the center of the liquid crystal display panel.

With reference to FIG. 1, for example, as viewed in a direction perpendicular to the first substrate or the second substrate, the spacer 3 and the sealant 2 constitute a closed region together, i.e., the continuous closed pattern or the discontinuous and spaced closed patterns for placing the elastic material 4. For example, a third closed pattern may be constituted by different line shapes, which does not affect its usability.

For example, a method for fabricating the liquid crystal display panel comprises coating the elastic material 4 on an edge of one side of the spacer 3 that is away from the display region; disposing the spacer 3 on the color filter substrate according to a predetermined shape after solidification of the elastic material 4, the side of the spacer 3 not disposing the elastic material 4 is close to a center position of the color filter substrate; instilling the liquid crystal 1 within the shape formed by the spacer 3; coating the sealant 2 outside the shape formed by the spacer 3; and cell-assembling the array substrate and the color filter substrate in vacuum, to solidify the sealant 2.

An embodiment of the invention further provides a display device, comprising the liquid crystal display panel as described above.

In the liquid crystal display panel and the display device provided by the embodiment of the invention, a normal display of the liquid crystal panel is maintained, by filling the elastic material 4 with a good elasticity in the semi-closed space formed between the spacer 3, the sealant 2, the first substrate 10 and the second substrate 20, on the principle that the elastic material 4 changes in volume with the liquid crystal 1 at different temperatures. In a low temperature state, when the amount of liquid crystal filled in the panel is close to a lower limit or at the lower limit, the liquid crystal 1 contracts to form a vacuum space in the panel, and the elastic material 4 expands in the vacuum space to fill up such part of space; as compared with an arrangement of the PS used in the prior art, due to a strong elasticity and a large range of deformation amount of the elastic material 4, a corresponding fillable vacuum space range is also relatively large, and the lower limit for the liquid crystal amount ranged instilled may be further lowered, i.e., when less amount of liquid crystal is instilled, the elastic material 4 still has enough deformation amount to fill the vacuum space formed thereby, thus preventing formation of vacuum bubbles; in a high temperature state, when the amount of liquid crystal filled in the panel is close to an upper limit or at the upper limit, the liquid crystal 1 expands to squeeze the elastic material 4 to make it contract and shrink in volume, the expanding liquid crystal 1 fills in the space where the elastic material 4 contracts, attenuating squeeze thereof to the first substrate and the second substrate; as compared with the arrangement of the PS used in the prior art, due to a strong elasticity and a large range of deformation amount of the elastic material 4, a corresponding contractible space range is also relatively large, the upper limit for the liquid crystal amount ranged instilled may be further raised, i.e., when more amount of liquid crystal amount is instilled, the elastic material 4 still has enough deformation amount to contract under the squeeze of the liquid crystal 1, to form a space to accommodate the expanding liquid crystal 1. As described above, as compared with the arrangement of the PS used in the liquid crystal panel in the prior art, the elastic material 4 lowers the lower limit and raises the upper limit thereof on the basis of the original liquid crystal amount range, enlarges the instillable range of the liquid crystal, so that liquid crystal instillation is easier to operate during a fabrication process of the liquid crystal panel.

The foregoing embodiments merely are exemplary embodiments of the invention, and not intended to define the scope of the invention, and the scope of the invention is determined by the appended claims.

The present application claims priority of Chinese Patent Application No. 201410355440.9 filed on Jul. 24, 2014, and the entire of which is incorporated by reference herein as part of the present application.

What is claimed is:

1. A liquid crystal display panel, comprising: a first substrate and a second substrate disposed to be opposed to each other, the first substrate and the second substrate being bonded by sealant located in peripheral regions of the first substrate and the second substrate to form a box-shaped space, with liquid crystal and a spacer for supporting the box-shaped space filled in the box-shaped space, wherein,
   the spacer is disposed at a position close to the sealant,
   as viewed in a direction perpendicular to the first substrate or the second substrate, a filling region is enclosed by the sealant and the spacer,
   an elastic material is filled in the filling region between the first substrate and the second substrate.

2. The liquid crystal display panel according to claim 1, wherein, as viewed in the direction perpendicular to the first substrate or the second substrate, the filling region has a width of 1 mm~10 mm along a direction perpendicular to an extending direction of the sealant.

3. The liquid crystal display panel according to claim 1, wherein, the elastic material is formed by mixing 6101 epoxy resin, propylene carbonate and diethylene triamine at a predetermined ratio.

4. The liquid crystal display panel according to claim 3, wherein, the predetermined ratio is a mass ratio of 5:4:1.

5. The liquid crystal display panel according to claim 2, wherein, one end of the spacer facing the first substrate is in contact with the first substrate, and the other end of the spacer facing the second substrate is spaced from the second substrate by a predetermined distance, a distance between the elastic material and the second substrate being equal to the predetermined distance.

6. The liquid crystal display panel according to claim 2, wherein, the predetermined distance is 0.01 μm~0.1 μm.

7. The liquid crystal display panel according to claim 2, wherein, as viewed in a direction perpendicular to the first substrate or the second substrate, the spacer is a continuous pattern or comprises a plurality of segments separated from each other.

8. The liquid crystal display panel according to claim 7, wherein, the spacer forms the continuous pattern at an inner side of the sealant, the spacer being spaced from the sealant by a distance equal to the filling width of the filling region.

9. The liquid crystal display panel according to claim 8, wherein, the filling region is a continuous region enclosed by the spacer and the sealant.

10. The liquid crystal display panel according to claim 7, wherein, the spacer comprises the plurality of segments, each segment defines one sub-region together with the sealant, and the filling region comprises a plurality of sub-regions.

11. A display device, comprising a liquid crystal display panel, the liquid crystal display panel comprising:
    a first substrate and a second substrate disposed to be opposed to each other, the first substrate and the second substrate being bonded by sealant located in peripheral regions of the first substrate and the second substrate to form a box-shaped space, with liquid crystal and a spacer for supporting the box-shaped space filled in the box-shaped space, wherein,
    the spacer is disposed at a position close to the sealant,
    as viewed in a direction perpendicular to the first substrate or the second substrate, a filing regions is enclosed by the sealant and the spacer,
    an elastic material is filled in the filling region between the first substrate and the second substrate.

12. The display device according to claim 11, wherein, as viewed in the direction perpendicular to the first substrate or the second substrate, the filling region has a width of 1 mm~10 mm along a direction perpendicular to an extending direction of the sealant.

13. The display device according to claim 11, wherein, the elastic material is formed by mixing 6101 epoxy resin, propylene carbonate and diethylene triamine at a predetermined ratio.

14. The display device according to claim 13, wherein, the predetermined ratio is a mass ratio of 5:4:1.

15. The display device according to claim 12, wherein, one end of the spacer facing the first substrate is in contact with the first substrate, and the other end of the spacer facing the second substrate is spaced from the second substrate by a predetermined distance, a distance between the elastic material and the second substrate being equal to the predetermined distance.

16. The display device according to claim 12, wherein, the predetermined distance is 0.01 μm~0.1 μm.

17. The display device according to claim 12, wherein, as viewed in a direction perpendicular to the first substrate or the second substrate, the spacer is a continuous pattern or comprises a plurality of segments separated from each other.

18. The display device according to claim 17, wherein, the spacer forms the continuous pattern at an inner side of the sealant, the spacer being spaced from the sealant by a distance equal to the filling width of the filling region.

19. The display device according to claim 18, wherein, the filling region is a continuous region enclosed by the spacer and the sealant.

20. The display device according to claim 17, wherein, the spacer comprises the plurality of segments, each segment defines one sub-region together with the sealant, and the filling region comprises a plurality of sub-regions.

* * * * *